US010471554B2

(12) United States Patent
Graham et al.

(10) Patent No.: US 10,471,554 B2
(45) Date of Patent: Nov. 12, 2019

(54) FUEL INJECTOR BORE REPAIR

(71) Applicant: Caterpillar Inc., Peoria, IL (US)

(72) Inventors: Curtis John Graham, Peoria, IL (US);
Robert E. Sharp, Corinth, MS (US);
Daniel Thomas Cavanaugh,
Chillicothe, IL (US); Robert Louis
Brockman, Michie, TN (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 15/682,813

(22) Filed: Aug. 22, 2017

(65) Prior Publication Data
US 2019/0061072 A1 Feb. 28, 2019

(51) Int. Cl.
| B23P 6/02 | (2006.01) |
| B23P 6/04 | (2006.01) |
| B23P 19/04 | (2006.01) |
| C23C 24/04 | (2006.01) |
| F02B 23/06 | (2006.01) |
| F02F 3/14 | (2006.01) |
| C23C 4/01 | (2016.01) |
| C23C 4/18 | (2006.01) |

(52) U.S. Cl.
CPC ............... B23P 6/02 (2013.01); B23P 6/04 (2013.01); B23P 19/043 (2013.01); C23C 24/04 (2013.01); F02B 23/0627 (2013.01); F02F 3/14 (2013.01); C23C 4/01 (2016.01); C23C 4/18 (2013.01); F02M 2200/8076 (2013.01)

(58) Field of Classification Search
CPC .. B23P 6/02; B23P 6/04; B23P 19/043; B23P 6/00; C23C 24/04; F02B 23/0627; F02F 3/14; F02F 1/24; F02F 11/02; F02M 61/14; F02M 51/061; F02M 2200/8015
See application file for complete search history.

(56) References Cited

U.S. PATENT DOCUMENTS

| 7,458,358 | B2 | 12/2008 | Lineton et al. | |
| 8,486,249 | B2 | 7/2013 | Almond et al. | |
| 8,601,663 | B2 | 12/2013 | Ngo et al. | |
| 9,574,536 | B2 * | 2/2017 | Oohata | F02M 61/14 |
| 2004/0020469 | A1 * | 2/2004 | Reiter | F02M 61/14 123/470 |
| 2012/0217323 | A1 * | 8/2012 | Martinsson | B21D 53/84 239/533.2 |
| 2014/0115854 | A1 | 5/2014 | Widener et al. | |
| 2015/0020386 | A1 * | 1/2015 | Shaw | F02F 1/242 29/888.011 |
| 2017/0363054 | A1 * | 12/2017 | Pickard | F02M 61/14 |

* cited by examiner

Primary Examiner — Syed O Hasan
(74) Attorney, Agent, or Firm — Law Office of Kurt J. Fugman LLC

(57) ABSTRACT

A method for remanufacturing or repairing a cylinder head having a bore configured to receive a fuel injector comprises machining a portion of a surface forming the bore to remove imperfections, inserting a repair component into the bore proximate the machined portion of the bore, and spraying material into the bore proximate the machined portion and the repair component, thereby holding the component into place.

16 Claims, 7 Drawing Sheets

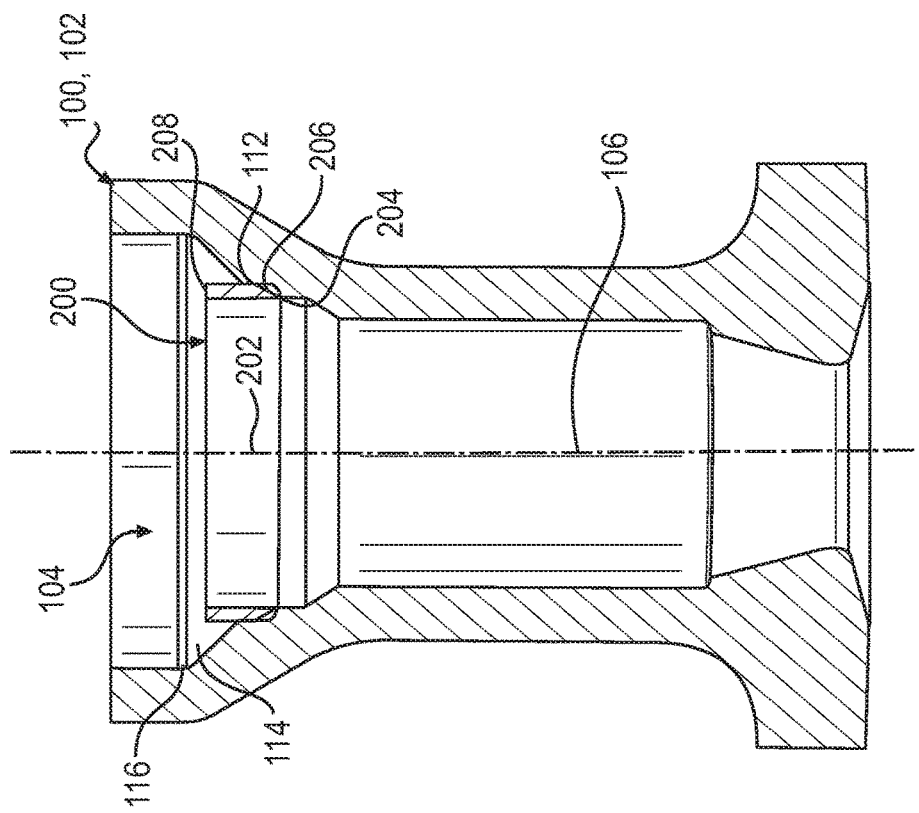
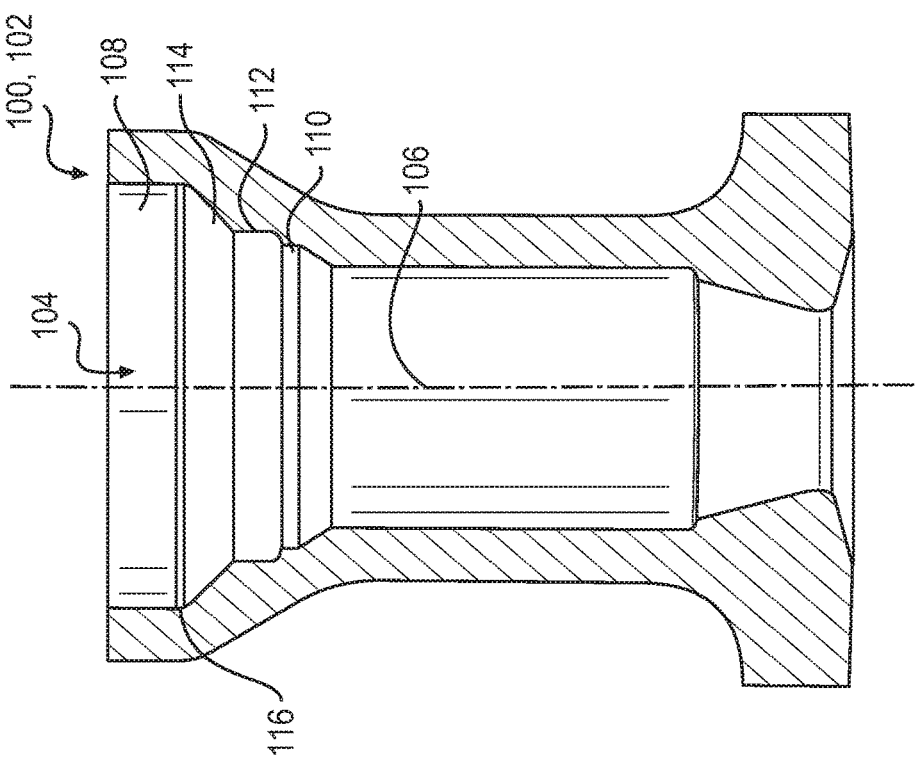

FUEL INJECTOR BORE REPAIR

TECHNICAL FIELD

The present disclosure relates generally to fuel injector bores disposed in cylinder heads that are configured to house a fuel injector. More specifically, the present disclosure relates to a method of remanufacturing, refurbishing or repairing such fuel injector fuel injector bores so that seals located between the fuel injector and the fuel injector bore are able to prevent fluid leakage.

BACKGROUND

Fuel injectors are routinely housed in the fuel injector bore of a cylinder head that is configured to closely match the outside shape of the fuel injector. Seals are disposed at one or more places between the outside housing of the fuel injector and the inside surface of the fuel injector bore of the cylinder to prevent the leakage of fuel into the water jacket of the cylinder head. Over time, the areas located adjacent the seals on the inside surface of the fuel injector bore may become worn or pitted, which may reduce the effectiveness of the seals to prevent leakage of the fuel into the water jacket. More particularly, fuel may seep into the areas between the fuel injector and the surfaces of the bore of the cylinder head, which along with heat, may produce pitting of the surfaces because of the corrosive nature of the sulfur in the fuel catalyzed by the heat, negatively impacting the effectiveness of seal in that area. Eventually, a leak may occur and this may lead to the engine malfunctioning, necessitating repair and maintenance and an associated economic loss for the industrial endeavor using the engine.

Of course, it may be difficult and/or expensive to repair or replace the cylinder head. One known method for repairing threaded components is disclosed by U.S. Pat. No. 8,601,663 to Ngo et al. As shown by the abstract of Ngo, this patent is directed to repairing damage to an internally threaded opening. More specifically, methods are provided for structurally repairing a component having a damaged internally threaded opening. The damaged internally threaded opening is machined to a predetermined diameter, thereby forming a machined opening. At least one notch is formed in the machined opening, thereby forming a notched opening. A selected amount of repair material is cold sprayed into the notched opening, including into the at least one notch. A plurality of internal threads is formed from the repair material to form a repaired internally threaded opening in the component. The repaired components are also provided. However, this process does not teach how to provide a suitable repair so that a fluid tight seal may be provided and maintained in a harsh environment such as an engine where temperatures and corrosive agents may be present.

Accordingly, it is desirable to develop a method and apparatus that may allow the user of an engine to remanufacture, refurbish or otherwise repair the fuel injector bore of a cylinder head that may house a fuel injector and provide a fluid tight seal between the fuel injector and the cylinder head in a reliable and economic manner.

SUMMARY OF THE DISCLOSURE

A cylinder head according to an embodiment of the present disclosure is provided comprising a body defining a bore having a longitudinal axis and configured to receive a fuel injector, the body may also define a large diameter portion of the bore, a small diameter portion of the bore and an intermediate diameter portion of the bore disposed axially between the large diameter portion of the bore and the small diameter portion of the bore, the body further defining a machined chamfered portion extending axially from the large diameter portion of the bore to the intermediate portion of the bore. The body may further define a machined step disposed axially between the large diameter portion of the bore and the chamfered portion of the bore.

A cylinder head assembly according to an embodiment of the present disclosure is provided including a cylinder head configured to receive a fuel injector. The cylinder head may comprise a body defining a bore having a longitudinal axis and configured to receive a fuel injector. The body also defining a large diameter portion of the bore, a small diameter portion of the bore and an intermediate diameter portion of the bore disposed axially between the large diameter portion of the bore and the small diameter portion of the bore. The body may further define a machined chamfered portion extending axially from the large diameter portion of the bore to the intermediate portion of the bore and a machined step disposed axially between the large diameter portion of the bore and the chamfered portion of the bore. A fuel injector may be disposed in the bore of the cylinder head.

A method for remanufacturing or repairing a cylinder head having a bore configured to receive a fuel injector according to an embodiment of the present disclosure is provided. The method may comprise machining a portion of a surface forming the bore to remove imperfections, inserting a repair component into the bore proximate the machined portion of the bore, and spraying material into the bore proximate the machined portion and the repair component, thereby holding the component into place.

BRIEF DESCRIPTION OF THE DRAWINGS

FIG. 1 is a cut-away side view of a fuel injector bore of a cylinder head with eroded areas machined away according to various embodiments of the present disclosure.

FIG. 2 is a cut-away side view of the fuel injector bore of the cylinder head of FIG. 1 showing a repair sleeve being inserted in a counterbore adjacent the machined surfaces.

DETAILED DESCRIPTION

Figure 3:
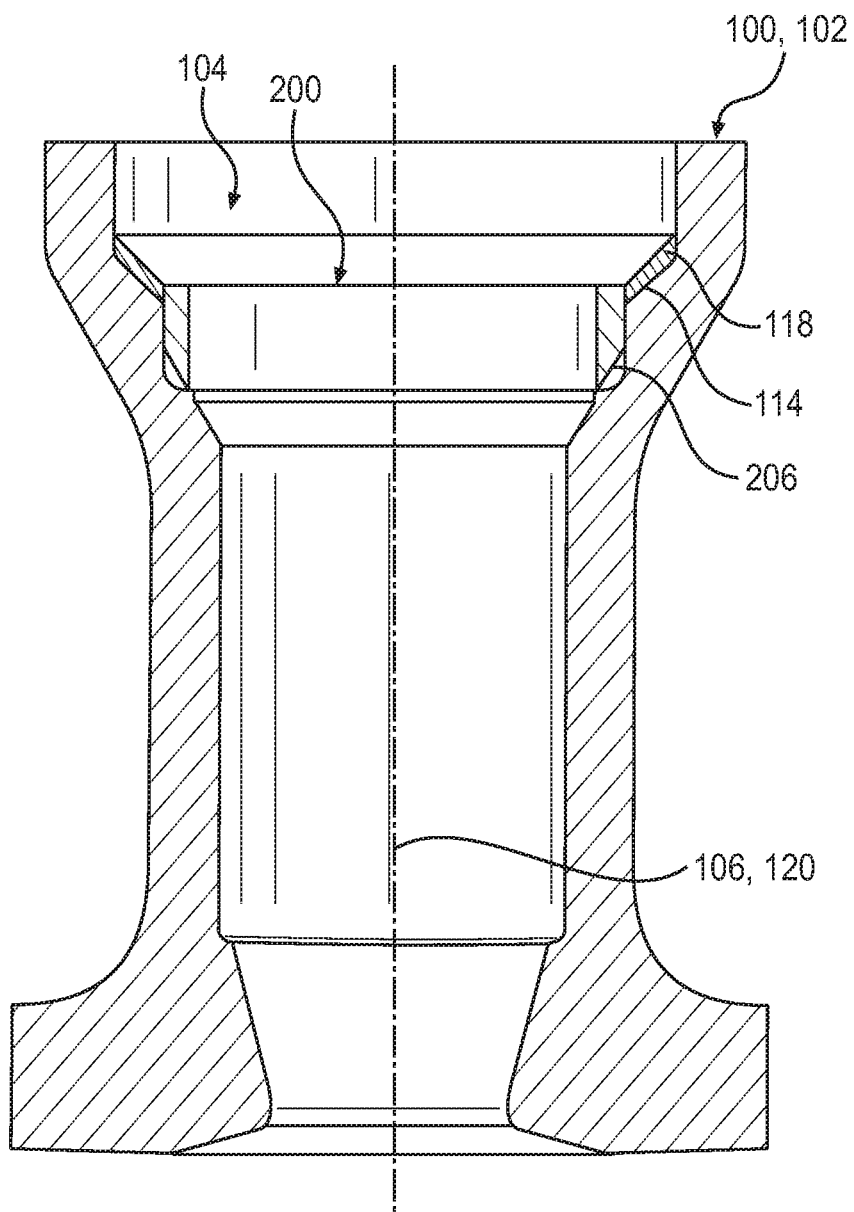
FIG. 3 is a cut-away side view of the fuel injector bore of the cylinder head of FIG. 2 where a metal cold spray process has been applied to the machined chamfered area above the repair sleeve.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A method for repairing a cylinder head, the resulting cylinder head, or other similar component and the associated cylinder head assembly with a fuel injector installed or uninstalled according to various embodiments of the present disclosure will now be described. While the application discussed herein is primarily a cylinder head used with large engines, it is to be understood that in other embodiments that any sized cylinder head using any type of fuel injector may be used and/or benefit from the embodiments discussed herein. Similarly, the type of fuel injected by the injector may be varied and includes diesel fuel, gasoline, etc. Accordingly, the applications of the embodiments discussed herein are applicable to a host of engine types and to a host of machines driven by such engines.

Looking at FIG. 1, a cylinder head configured to receive a fuel injector according to an embodiment of the present disclosure is illustrated. The cylinder head 100 comprises a body 102 defining a bore 104 having a longitudinal axis 106 and that is configured to receive a fuel injector 302 (only shown in FIG. 7). The bore 104 of the body 102 also defines a large diameter portion 108 of the bore 104, a small diameter portion 110 of the bore 104 and an intermediate diameter portion 112 of the bore 104 disposed axially between the large diameter portion 108 of the bore 104 and the small diameter portion 110 of the bore 104. The body 102 further defines a machined chamfered portion 114 extending axially from the large diameter portion 108 of the bore 104 to the intermediate portion 112 of the bore 104. Furthermore, the body 102 further defines a machined step 116 (best seen in FIG. 6) disposed axially between the large diameter portion 108 of the bore 104 and the chamfered portion 114 of the bore 104. The machining helps to remove imperfections such as pitting, erosion, damage etc. that may have occurred over time to the surfaces of the bore 104. Machining may include milling, EDM (electrical discharge machining), etc.

In some embodiments, the machined step 116 and the machined chamfered portion 114 include surfaces having a surface roughness with a Ra value of 3.2 microns or greater to allow better adherence of sprayed material as will be further described later herein.

Referring now to FIG. 2, the cylinder head 100 may further comprise a repair sleeve 200 inserted into the intermediate diameter portion 112, wherein the repair sleeve 200 includes an annular cylindrical shape defining a cylindrical axis 202, a first end 204 disposed along the cylindrical axis 202 having a chamfered portion 206 and a second end 208 disposed along the cylindrical axis 202. The cylindrical axis 202 may be coextensive with the longitudinal axis 106 of the bore 104.

Figure 4:
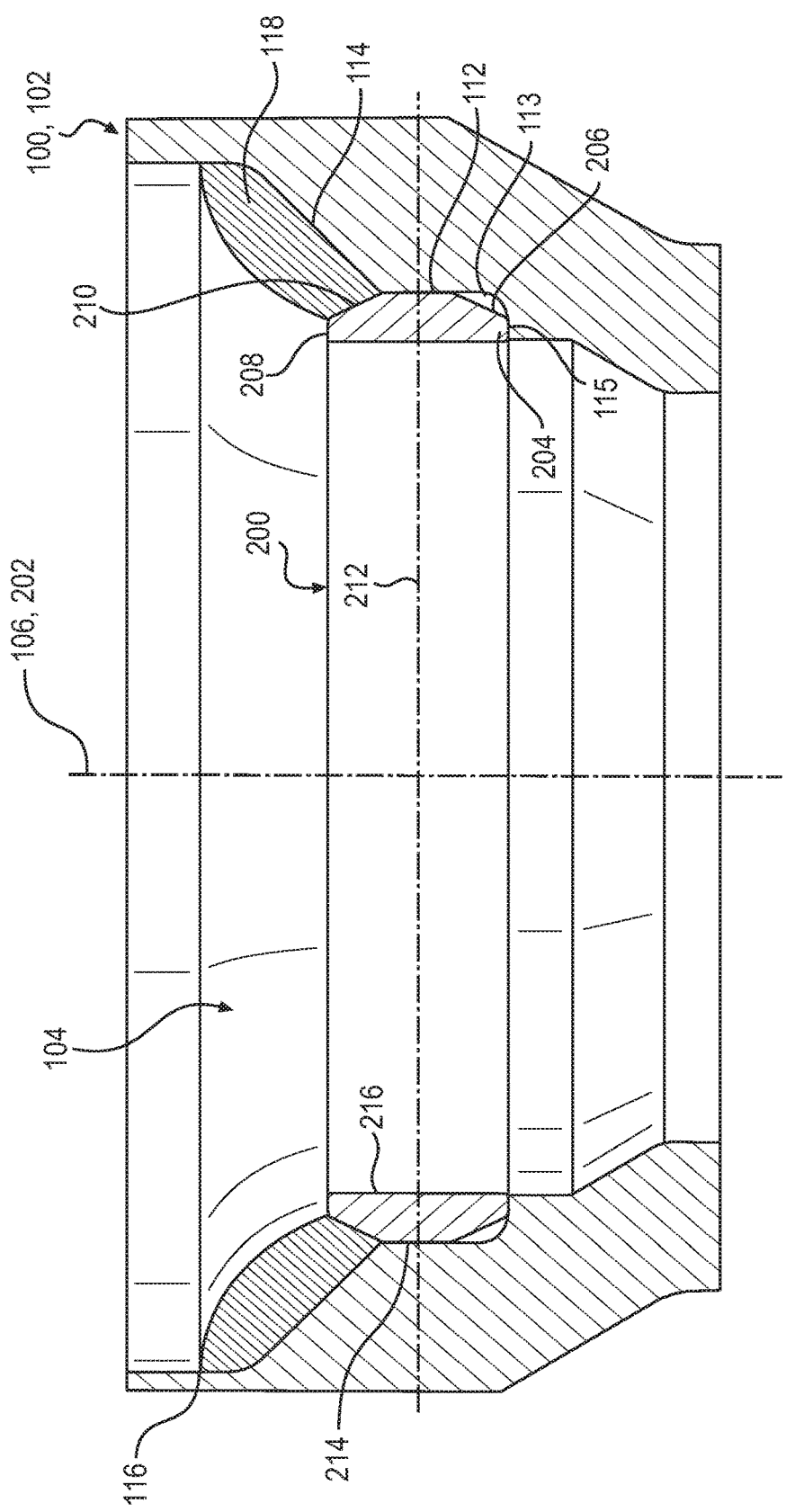
FIG. 4 is an enlarged detail view of the fuel injector bore of the cylinder head of FIG. 3, showing more clearly the interface between the repair sleeve and the metal cold spray deposited material and the profile of metal cold spray deposited material.

In some embodiments, such as that shown in FIG. 4, the second end 208 of the repair sleeve 200 also has a chamfered portion 210. In many embodiments, the repair sleeve 200 may be symmetrical about a midplane 212 positioned half way along the cylindrical axis 202 of the repair sleeve 200. In still other embodiments, the repair sleeve 200 is inserted into the intermediate diameter portion 112 of the bore 104 with a slight interference fit such as between 0.0005 of an inch to 0.0015 of an inch depending on the size of the outer diameter 214 of the repair sleeve 200. Furthermore, the interference fit may be designed in accordance with ISO standards for slight interference fits. In many embodiments, the intermediate diameter portion 112 is formed by a counterbore 113 with a flat bottom surface 115 and the repair sleeve 200 is inserted until the first end 204 of the repair sleeve 200 contacts or nearly contacts the flat bottom surface 115. The chamfered portion 206 of the first end 204 of the repair sleeve 200 is positioned toward the outside of the repair sleeve 200, helping to prevent corner interference with the counterbore 113, allowing the repair sleeve 200 to be fully seated. The material of the repair sleeve 200 may be stainless steel or any other suitably durable and corrosion resistant material.

Turning now to FIG. 3, some metal cold spray material 118 may be attached to the chamfered portion 114 of the bore 104 of the cylinder head 100 and the repair sleeve 200, helping to prevent the removal of the repair sleeve 200 from the bore 104 of the cylinder head 100 along a direction of disassembly 120, which is also substantially along the longitudinal axis 106 of the bore 104. As best seen in FIG. 4, the metal cold spray material 118 may bulge slightly into the bore 104 and may also contact the chamfered portion 210 positioned toward the outside of the second end 208 of the repair sleeve 200, forming an undercut 122 configured to prevent removal of the repair sleeve 200. The metal cold spray material 118 may be stainless steel, a nickel-aluminum alloy (e.g. 95% nickel and 5% aluminum) or any other sufficiently durable and corrosion resistant material. Any standard high pressure spray nozzle and associated systems may be used to lay down the metal cold spray material. In some embodiments, the spray nozzle may be placed within a quarter of an inch to half an inch of the area where the material is desired to be deposited (e.g. the machined chamfered portion 114 of the bore 104).

Figure 5:
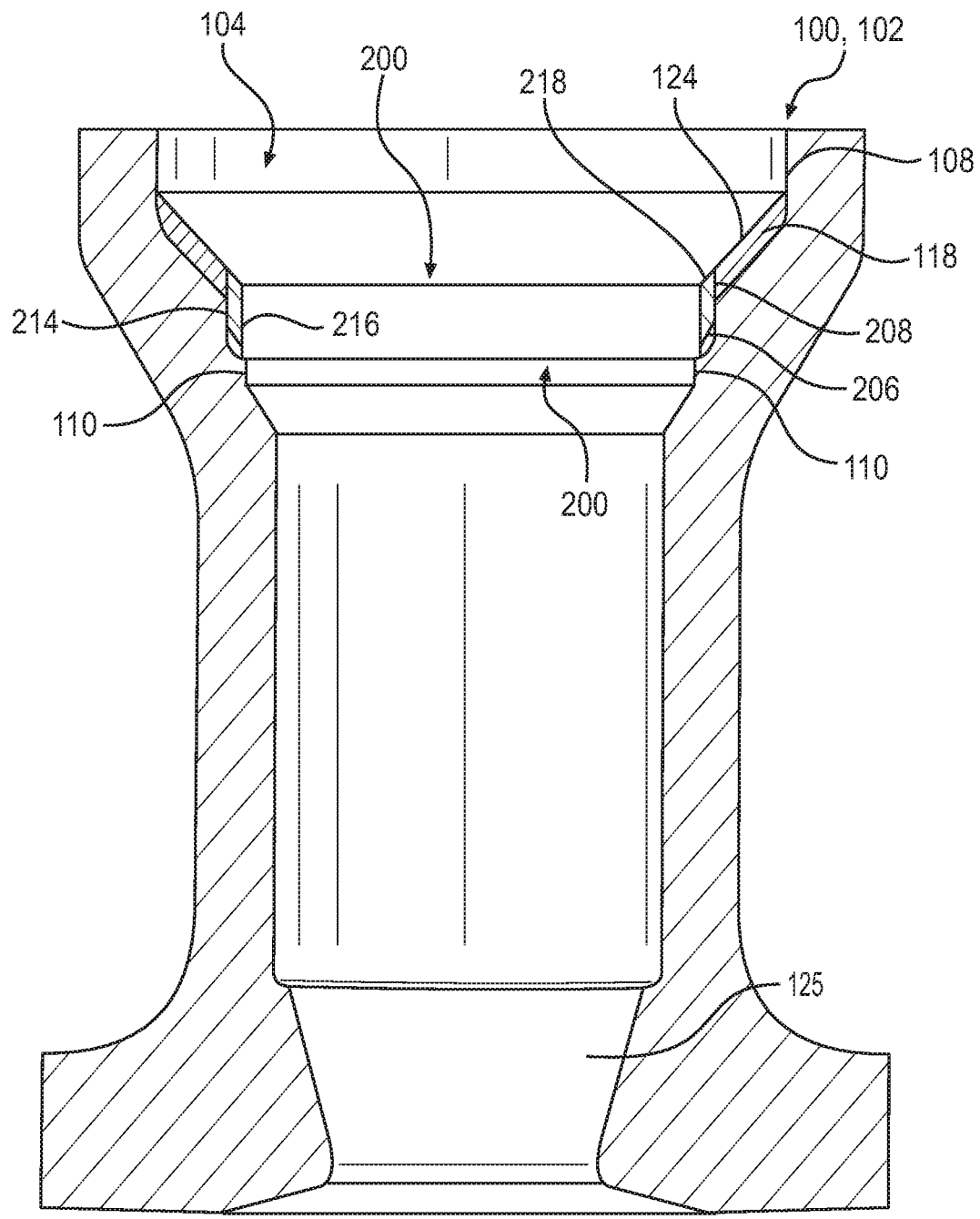
FIG. 5 is a cut-away side view of the fuel injector bore of the cylinder head of FIG. 3 after the metal cold spray deposited material and the repair sleeve have been machined to match the original dimensions of the fuel injector bore of the cylinder head.
Figure 6:
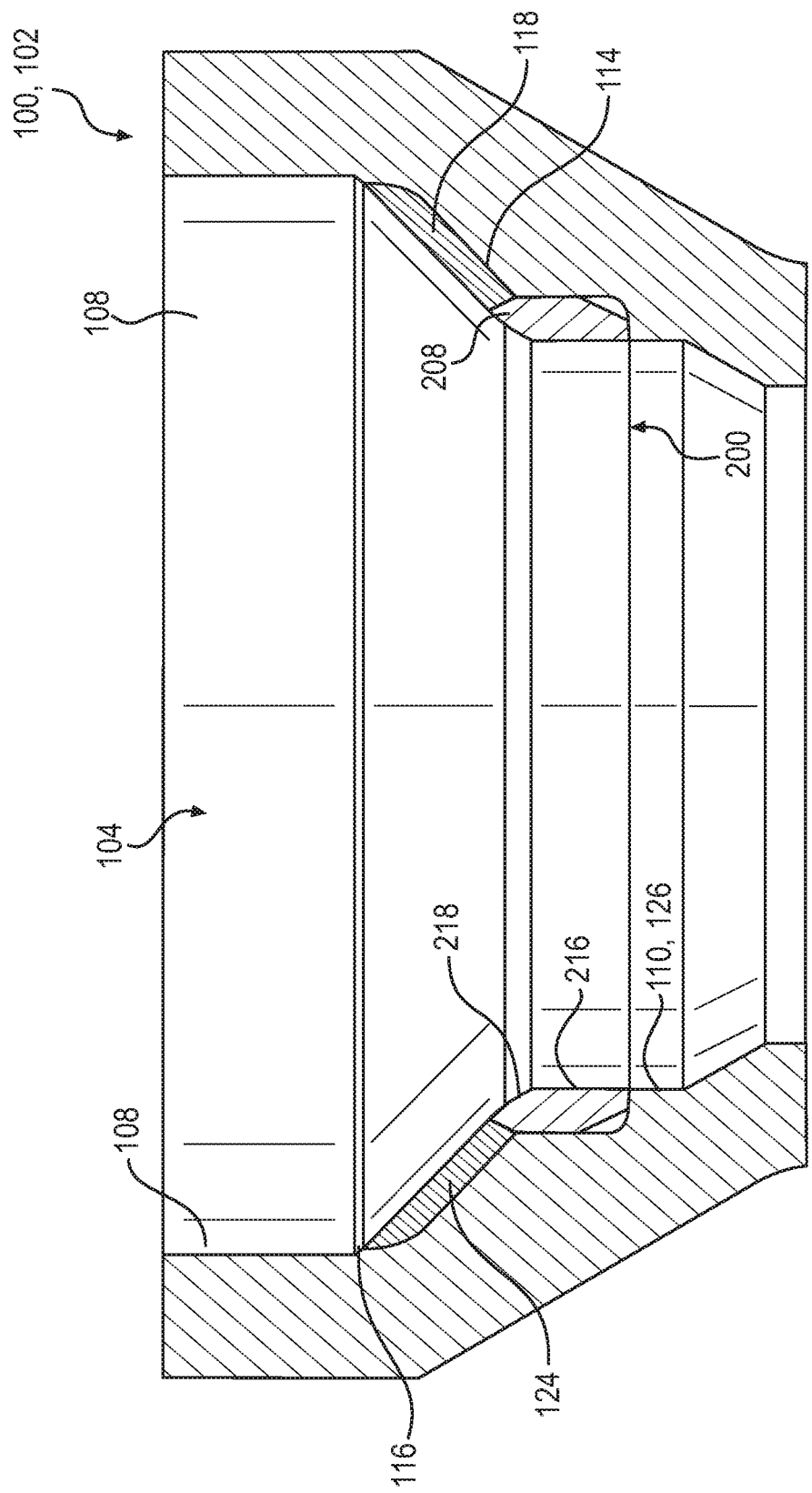
FIG. 6 is an enlarged detail view of the fuel injector bore of the cylinder head of FIG. 5, showing more clearly the interface between the repair sleeve and the metal cold spray deposited material and the profile of the metal cold spray deposited material after the finished machining operation has been completed.

Looking now at FIGS. 5 and 6, the repair sleeve 200 defines an inside cylindrical surface 216 and the metal cold spray material 118 is machined to create a finished machined chamfered portion 124 that smoothly transitions to the large diameter portion 108 of the bore 104, and the inside cylindrical surface 216 is finish machined to be coextensive with the small diameter cylindrical portion 110. More specifically, the small diameter cylindrical portion 110 defines a small inside cylindrical surface 126 that would be coextensive with the inside cylindrical surface 216 of the repair sleeve 200 after being finish machined. Also, the inside portion 218 of the second end 208 of the repair sleeve 200 is also finish machined to provide a smooth transition from the chamfered portion 124 of the sprayed material 118 to the inside cylindrical surface 216 of the repair sleeve 200.

Figure 7:
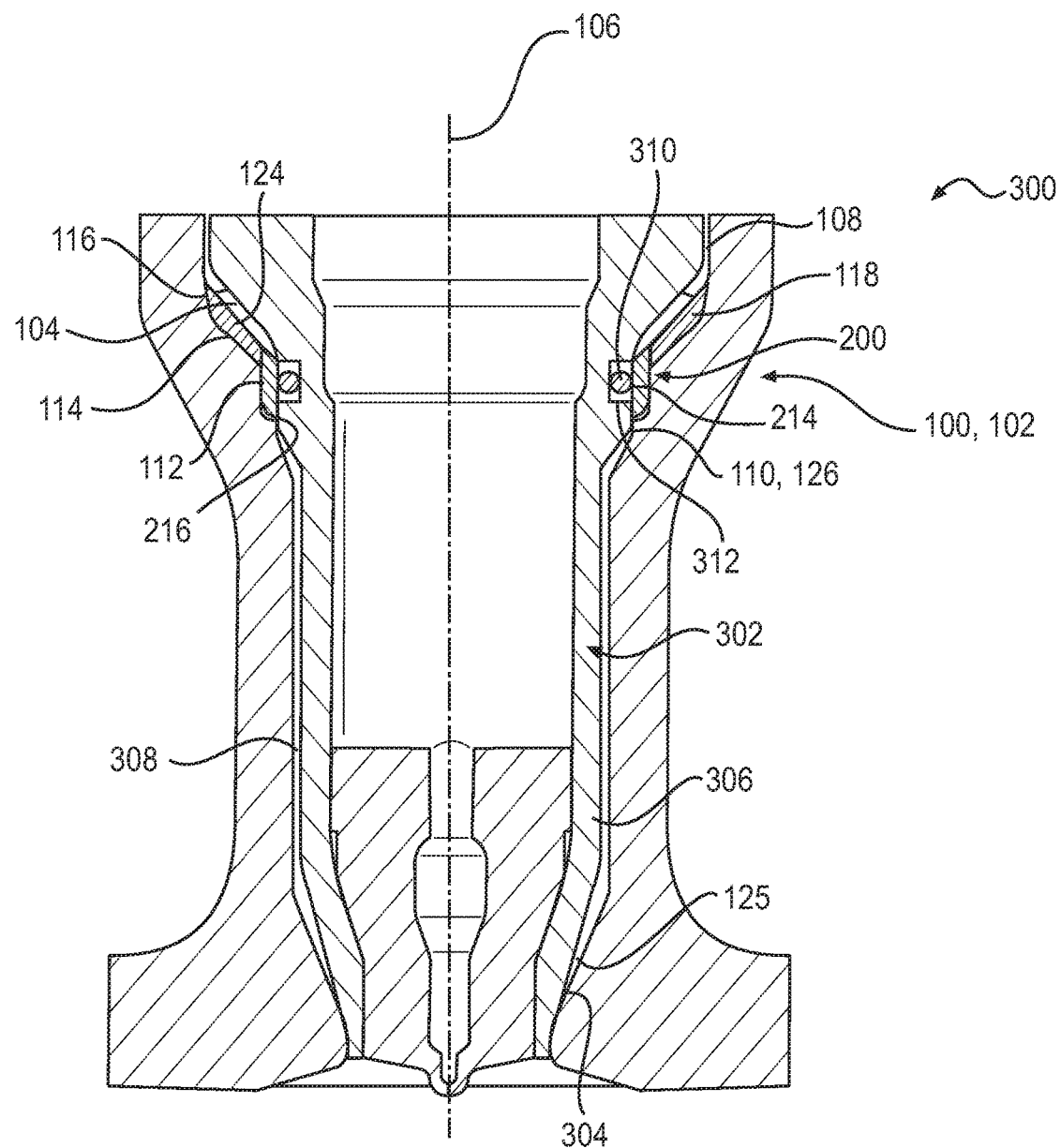
FIG. 7 is cut-away side view showing the fuel injector bore of the cylinder head of FIG. 5 with a fuel injector inserted into the bore and a seal contacting the repaired section of the fuel injector bore and the housing of the fuel injector, providing a fluid tight seal.

Focusing now on FIG. 7, a cylinder head assembly 300 that may be part of an engine according to an embodiment of the present disclosure will now be described. The cylinder head assembly 300 may include a cylinder head 100 and repair sleeve 200 as previously described with respect to FIGS. 1 thru 6. Specifically, the cylinder head 100 may be configured to receive a fuel injector 302 and may include a body 102 defining a bore 104 having a longitudinal axis 106 and may be configured to receive a fuel injector 302. The bore 104 of the body 102 may also define a large diameter portion 108 of the bore 104, a small diameter portion 110 of the bore 104 and an intermediate diameter portion 112 of the bore 104 disposed axially between the large diameter portion 108 of the bore 104 and the small diameter portion 110 of the bore 104. The bore 104 may have a machined chamfered portion 114 extending axially from the large diameter portion 108 of the bore 104 to the intermediate diameter portion 112 of the bore 104 with a machined step 116 disposed axially between the large diameter portion 108 of the bore 104 and the chamfered portion 114 of the bore 104. This structure may be seen by sectioning the cylinder head 100 along a midplane of the bore 104, revealing the structure of FIG. 7.

A fuel injector 302 may be disposed in the bore 104 with the front portion or tip 304 of the housing 306 of the fuel injector 302 contacting the angled bottom surface 128 of the bore 104. The rest of the housing 306 of the fuel injector 302 may be slightly spaced away or may be provided with a slight gap 308 between the housing 306 of the fuel injector 302 and the various surfaces of the bore 104 of the cylinder head 100. As alluded to earlier herein, the repair sleeve 200 defines an inside cylindrical surface 216, the small diameter portion 110 of the bore 104 defines a small inside cylindrical surface 126 and the metal cold spray material 118 is finish machined to create a finish machined chamfered portion 124 that smoothly transitions to the large diameter portion 108 of the bore 104, and the inside cylindrical surface 216 is finish machined to be coextensive with the small inside cylindrical surface 126 of the small diameter cylindrical portion 110 of the bore 108. A seal 310 is sandwiched between the housing 306 of the fuel injector 302 and the inside cylindrical surface 216 of the repair sleeve 200, providing a fluid tight seal. For this embodiment, the seal 310 is an o-ring that is situated in an o-ring groove 312 formed by the housing 306 of the fuel injector 302. Other types of seals may be used and may be held in place using other configurations of the repair sleeve 200 and/or the housing 306.

Referring back to FIG. 1, the cylinder head 100 comprises a body 102 defining a bore 104 having a longitudinal axis 106 and that is configured to receive a fuel injector 302. The bore 104 of the body 102 also defines a large diameter portion 108 of the bore 104, a small diameter portion 110 of the bore 104 and an intermediate diameter portion 112 of the bore 104 disposed axially between the large diameter portion 108 of the bore 104 and the small diameter portion 110 of the bore 104. The body 102 further defines a machined chamfered portion 114 extending axially from the large diameter portion 108 of the bore 104 to the intermediate diameter portion 112 of the bore 104. Furthermore, the body 102 further defines a machined step 116 (best seen in FIG. 6) disposed axially between the large diameter portion 108 of the bore 104 and the chamfered portion 114 of the bore 104. The machining helps to remove imperfections such as pitting, erosion, damage etc. that may have occurred over time to the surfaces of the bore and may be performed using the processes discussed elsewhere herein.

In some embodiments, the machined step 116 and machined chamfered portion 114 include surfaces having a surface roughness with a Ra value of 3.2 microns or greater to allow better adherence of sprayed material as will be further described later herein.

Referring again to FIG. 2, the cylinder head 100 may further comprise a repair sleeve 200 inserted into the intermediate diameter portion 112, wherein the repair sleeve 200 includes an annular cylindrical shape defining a cylindrical axis 202, a first end 204 disposed along the cylindrical axis 202 having a chamfered portion 206 and a second end 208 disposed along the cylindrical axis 202. The cylindrical axis 202 may be coextensive with the longitudinal axis 106 of the bore 104. In some embodiments, such as that shown in FIG. 4, the second end 208 of the repair sleeve 200 also has a chamfered portion 210. In many embodiments, the repair sleeve 200 may be symmetrical about a midplane 212 positioned half way along the cylindrical axis 202 of the repair sleeve 200. In still other embodiments, the repair sleeve 200 is inserted into the intermediate diameter portion 112 of the bore 104 with a slight interference fit such as between 0.0005 of an inch to 0.0015 of an inch depending on the outer diameter 214 of the repair sleeve 200. In other embodiments, a slip fit may be provided. When an interference fit is employed, the interference fit may be designed in accordance with ISO standards for slight interference fits. The material of the repair sleeve 200 may be stainless steel or any other suitably durable and corrosion resistant material.

Referring back again to FIG. 3, some metal cold spray material 118 may be attached to the chamfered portion 114 of the bore 104 of the cylinder head 100 and the repair sleeve 200, helping to prevent the removal of the repair sleeve 200 from the bore 104 of the cylinder head 100 along a direction of disassembly 120, which is also substantially along the longitudinal axis 106 of the bore 104. As best seen in FIG. 4, the metal cold spray material 118 may bulge slightly into the bore 104 and may also contact the chamfered portion 114 of the second end 208 of the repair sleeve 200, forming an undercut 122 configured to prevent removal of the repair sleeve 200. The cold spray material 118 may be stainless steel, a nickel-aluminum alloy (e.g. 95% nickel and 5% aluminum) or any other sufficiently durable and corrosion resistant material. Any standard high pressure spray nozzle and associated systems may be used to lay down the metal cold spray material. In some embodiments, the spray nozzle may be placed within a quarter of an inch to half an inch of the area where the material is desired to be deposited.

Looking again at FIGS. 5 and 6, the repair sleeve 200 defines an inside cylindrical surface 216 and the metal cold spray material 118 is finish machined to create a finish machined chamfered portion 124 that smoothly transitions to the large diameter portion 108 of the bore 104, and the inside cylindrical surface 216 is finish machined to be coextensive with the small diameter cylindrical portion 110. More specifically, the small diameter cylindrical portion 110 defines a small inside cylindrical surface 126 that would be coextensive with the inside cylindrical surface 216 of the repair sleeve 200 after finish machining. Also, the inside portion 218 of the second end 208 of the repair sleeve 200 is also finish machined to provide a smooth transition from the chamfered portion 124 of the sprayed material 118 to the inside cylindrical portion 216 of the repair sleeve 200.

INDUSTRIAL APPLICABILITY

In practice, a repair component such as a repair insert or sleeve, a cylinder head, a cylinder head assembly and/or an engine assembly according to any embodiment described herein may be provided, sold, manufactured, and bought etc. to refurbish, retrofit or remanufacture existing engines, cylinder heads, cylinder head assemblies as needed or desired in an aftermarket or OEM context.

Figure 8:
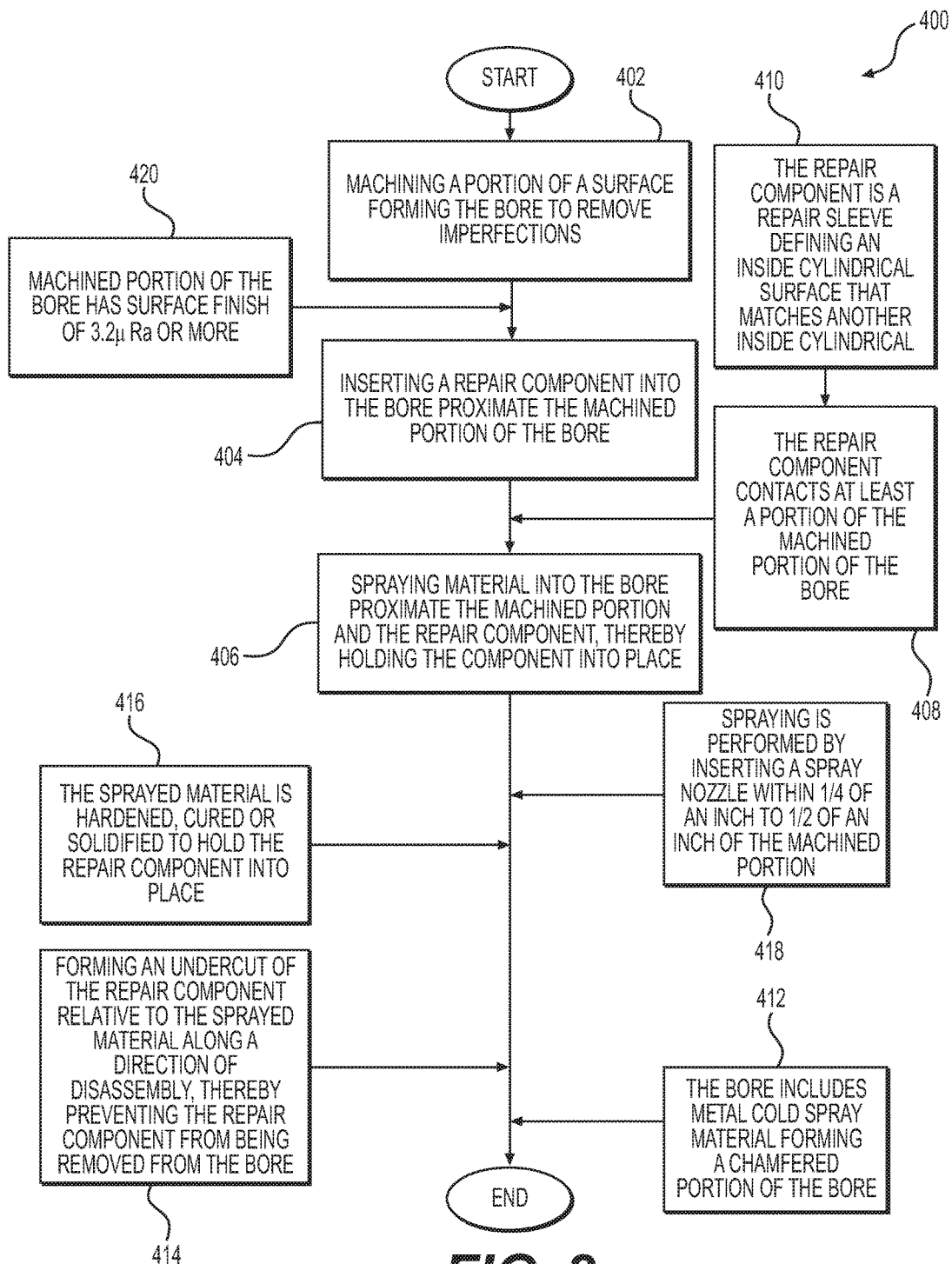
FIG. 8 is a flow chart containing a method for remanufacturing, refurbishing or repairing a fuel injector bore of a cylinder head and reinstalling a fuel injector into the bore while providing a fluid tight seal according to an embodiment of the present disclosure.

FIG. 8 is a method 400 for remanufacturing or repairing a cylinder head having a bore configured to receive a fuel injector, the method 400 comprising: machining a portion of a surface forming the bore to remove imperfections (step 402), inserting a repair component into the bore proximate the machined portion of the bore (step 404), and spraying material into the bore proximate the machined portion and the repair component, thereby holding the component into place (step 406).

In some embodiments, the repair component contacts at least a portion of the machined portion of the bore (step 408).

In some embodiments, the repair component is a repair sleeve defining an inside cylindrical surface that matches another inside cylindrical surface of the bore (step 410).

In certain embodiments, the bore includes metal cold spray material forming a chamfered portion of the bore (step 412). This chamfered portion may be provided after spraying, hardening and machining the sprayed material.

In some embodiments, the method further comprises forming an undercut of the repair component relative to the sprayed material along a direction of disassembly, thereby preventing the repair component from being removed from the bore (step 414).

The sprayed material may be hardened, cured or solidified in order to hold the repair component in place after the material has been sprayed (step 416).

During the spraying step, the spray nozzle may be inserted to be within a quarter of an inch to half an inch of the machined portion of the bore (step 418).

After machining a portion of the surface forming the bore to remove imperfections, the machined portion of the bore may have a surface finish of 3.2 microns Ra or more to help improve the adherence of the sprayed material to the surface of the bore (step 420).

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cylinder head configured to receive a fuel injector comprising: a body defining a bore having a longitudinal axis and configured to receive a fuel injector; the body also defining a large diameter portion of the bore, a small diameter portion of the bore and an intermediate diameter portion of the bore disposed axially between the large diameter portion of the bore and the small diameter portion of the bore, the body further defining a machined chamfered portion extending axially from the large diameter portion of the bore to the intermediate diameter portion of the bore; and wherein the body further defines a machined step disposed axially between the large diameter portion of the bore and the machined chamfered portion of the bore; a repair sleeve inserted into the intermediate diameter portion, wherein the repair sleeve includes an annular cylindrical shape defining a cylindrical axis, a first end disposed along the cylindrical axis having a chamfered portion and a second end disposed along the cylindrical axis and also having a chamfered portion; and a metal material attached to the machined chamfered portion of the bore of the cylinder head and the chamfered portion of the second end of the repair sleeve, forming an undercut configured to prevent removal of the repair sleeve.

2. The cylinder head of claim 1, wherein the machined step and machined chamfered portion includes surfaces having a surface roughness with a Ra value of 3.2 microns or greater.

3. The cylinder head of claim 1, wherein the repair sleeve is inserted into the intermediate diameter portion of the bore with a slight interference fit.

4. The cylinder head of claim 1, wherein the metal material includes a metal cold spray material.

5. The cylinder head of claim 4, wherein the repair sleeve defines an inside cylindrical surface, the small diameter cylindrical portion defines a small inside cylindrical surface and the metal cold spray material is finish machined to create a finish machined chamfered portion that smoothly transitions to the large diameter portion of the bore, and the inside cylindrical surface is finish machined to be coextensive with the small inside cylindrical surface of the small diameter cylindrical portion.

6. A cylinder head assembly comprising: a cylinder head configured to receive a fuel injector comprising: a body defining a bore having a longitudinal axis and configured to receive a fuel injector; the body also defining a large diameter portion of the bore, a small diameter portion of the bore and an intermediate diameter portion of the bore disposed axially between the large diameter portion of the bore and the small diameter portion of the bore, the body further defining a machined chamfered portion extending axially from the large diameter portion of the bore to the intermediate diameter portion of the bore; wherein the body further defines a machined step disposed axially between the large diameter portion of the bore and the machined chamfered portion of the bore; a repair sleeve inserted into the intermediate diameter portion, wherein the repair sleeve includes an annular cylindrical shape defining a cylindrical axis, a first end disposed along the cylindrical axis having a chamfered portion and a second end disposed along the cylindrical axis and also having a chamfered portion; a metal material attached to the machined chamfered portion of the bore of the cylinder head and the chamfered portion of the second end of the repair sleeve, forming an undercut configured to prevent removal of the repair sleeve; and a fuel injector disposed in the bore of the cylinder head.

7. The cylinder head assembly of claim 6, wherein the machined step and machined chamfered portion includes surfaces having a surface roughness with a Ra value of 3.2 microns or greater.

8. The cylinder head assembly of claim 6, wherein the repair sleeve is inserted into the intermediate diameter portion of the bore with a slight interference fit.

9. The cylinder head assembly of claim 6, wherein the metal material includes a metal cold spray material.

10. The cylinder head assembly of claim 9, wherein the repair sleeve defines an inside cylindrical surface, the small diameter portion of the bore defines a small inside cylindrical surface and the metal cold spray material is finish machined to create a finish machined chamfered portion that smoothly transitions to the large diameter portion of the bore, and the inside cylindrical surface is finish machined to be coextensive with the small inside cylindrical surface of the small diameter cylindrical portion.

11. The cylinder head assembly of claim 6, further comprising:
   a repair sleeve inserted into the intermediate diameter cylindrical portion defining an inside cylindrical surface that is substantially coextensive with the small diameter cylindrical portion;
   cold metal spray material that contacts the repair sleeve and the machined chamfered portion of the bore; and
   a seal disposed between the fuel injector and the repair sleeve.

12. A method for remanufacturing or repairing a cylinder head having a bore configured to receive a fuel injector, the method comprising: machining a portion of a surface forming the bore in a body of the cylinder head to remove imperfections, the body having each of a large, a small, and an intermediate diameter portion of the bore, the intermediate diameter portion disposed axially between the large and small diameter portions, and the body further having a machined chamfered portion extending axially from the large diameter portion to the intermediate diameter portion, and a machined step disposed axially between the large diameter portion and the machined chamfered portion of the bore; inserting a repair sleeve component into the intermediate diameter portion of the bore proximate the machined portion of the bore, the repair sleeve including an annular cylindrical shape defining a cylindrical axis, a first end disposed along the cylindrical axis having a chamfered portion and a second end disposed along the cylindrical axis and also having a chamfered portion; and spraying metal material into the bore proximate the machined portion and the repair component, to attach the machined chamfered portion of the bore of the cylinder head to the chamfered portion of the second end of the repair sleeve component and forming an undercut preventing removal of the repair sleeve.

13. The method of claim 12 wherein the repair component contacts at least a portion of the machined portion of the bore.

14. The method of claim 13, wherein the repair sleeve defining an inside cylindrical surface that matches another inside cylindrical surface of the bore.

15. The method of claim 13, wherein the metal material includes metal cold spray material.

16. The method of claim 13, wherein the undercut is formed along a direction of disassembly.

* * * * *